United States Patent
Chemla et al.

(10) Patent No.: US 6,999,453 B1
(45) Date of Patent: Feb. 14, 2006

(54) DISTRIBUTED SWITCH FABRIC ARBITRATION

(75) Inventors: Guy M. Chemla, Rosh Haayin (IL); Peter Si-Sheng Wang, Cupertino, CA (US)

(73) Assignee: 3Com Corporation, Marlborough, MA (US)

( * ) Notice: Subject to any disclaimer, the term of this patent is extended or adjusted under 35 U.S.C. 154(b) by 932 days.

(21) Appl. No.: 09/901,403

(22) Filed: Jul. 9, 2001

(51) Int. Cl.
H04L 12/56 (2006.01)
H04J 3/02 (2006.01)

(52) U.S. Cl. .................. 370/389; 370/412; 370/462
(58) Field of Classification Search .............. 370/360, 370/386–388, 412–414, 462
See application file for complete search history.

(56) References Cited

U.S. PATENT DOCUMENTS

| | | | | |
|---|---|---|---|---|
| 4,516,238 A | | 5/1985 | Huang et al. ............... 370/60 |
| 4,623,996 A | | 11/1986 | McMillen .................. 370/60 |
| 5,179,552 A | | 1/1993 | Chao ......................... 370/60 |
| 5,197,064 A | | 3/1993 | Chao ......................... 370/60 |
| 5,319,639 A | | 6/1994 | Guha ......................... 370/60 |
| 5,502,718 A | | 3/1996 | Lane et al. ............... 370/58.2 |
| 5,590,123 A | | 12/1996 | Lyles et al. ............... 370/397 |
| 5,689,500 A | * | 11/1997 | Chiussi et al. ........... 370/235 |
| 5,689,644 A | | 11/1997 | Chou et al. ............. 395/200.06 |
| 5,883,895 A | | 3/1999 | Davis et al. ............... 370/462 |
| 5,956,342 A | * | 9/1999 | Manning et al. ........... 370/414 |
| 5,996,019 A | * | 11/1999 | Hauser et al. ............. 709/235 |
| 6,044,061 A | * | 3/2000 | Aybay et al. ............... 370/230 |
| 6,072,772 A | * | 6/2000 | Charny et al. ............. 370/229 |
| 6,098,109 A | | 8/2000 | Kotzur et al. ............. 709/249 |
| 6,160,812 A | * | 12/2000 | Bauman et al. ............ 370/416 |
| 6,343,066 B1 | * | 1/2002 | Magill et al. .............. 370/230 |
| 6,519,225 B1 | * | 2/2003 | Angle et al. ............... 370/229 |
| 6,594,234 B1 | * | 7/2003 | Chard et al. .............. 370/236 |
| 6,654,343 B1 | * | 11/2003 | Brandis et al. ............ 370/229 |
| 6,667,984 B1 | * | 12/2003 | Chao et al. ................ 370/414 |
| 6,813,274 B1 | * | 11/2004 | Suzuki et al. ............. 370/412 |
| 2002/0141427 A1 | * | 10/2002 | McAlpine .................. 370/413 |

OTHER PUBLICATIONS http://www.cs.umass.edu/~weems/CmpSci635/635lecture9.html Lecture 9 Memory Hierarchy and Caching, consisting of 5 pages dated Aug. 18, 2000.
http://www.cs.umass.edu/~weems/CmpSci635lecture14.html Lecture 14: Networks and Multicomputers, consisting of 15 pages dated Aug. 18, 2000.

\* cited by examiner

*Primary Examiner*—John Pezzlo
*Assistant Examiner*—Hong Sol Cho
(74) *Attorney, Agent, or Firm*—Mark A Haynes; Haynes Beffel & Wolfeld LLP

(57) ABSTRACT

The scalability and throughput for high-capacity communication switches is improved by providing a distributed arbitration algorithm which addresses the arbitration inefficiency of prior art systems. Distributed arbitration logic units in each satellite unit in a communication switch execute a protocol for computing a connection map for the switch fabric during each arbitration cycle. The protocol includes a plurality of phases including broadcasting back-pressure parameters among the arbitration logic units, generating bids for access to switch fabric resources in each of the arbitration logic units utilizing information shared with other arbitration logic units, broadcasting the results of the bidding process, and configuring the switch fabric using the results.

27 Claims, 3 Drawing Sheets

DISTRIBUTED SWITCH FABRIC ARBITRATION

BACKGROUND OF THE INVENTION

1. Field of the Invention

The present invention relates to high-capacity switch architectures for communication systems, and more particularly to scalable switch architectures with distributed arbitration logic.

2. Description of Related Art

High-capacity communication switch architectures have been developed to address the growing numbers of users and uses of communication networks. The switch architectures are based on a variety of switch fabric designs, which includes a shared media switch in which either memory or bus resources are shared using time division multiplexing, a stacked Banyan, a mesh switch, a crossbar switch and others. There are various advantages and disadvantages of each type.

In the implementation of high-capacity communication switches, the establishment of connections between ports on the switches is made in response to the traffic flowing through the switch. The connections are made in switching cycles that allow for efficient use of the resources. In each switching cycle of some embodiments, an arbitration process is executed by which competition for the use of the ports on the switches is resolved. As the number of ports on a given switch increases, the complexity of arbitrating among the ports increases dramatically and requires an equivalent increase in processing power. Such arbitration must be executed efficiently and quickly so that the performance of the switch is maintained. However, the computation of optimal connection maps within the switch among a large number of possible routes can be a difficult problem in dynamically changing conditions.

It is often desirable to add capacity to a given switching system. The mesh type switch and the crossbar type switch are both capable of high-capacity switching, and have extendable architectures. The crossbar switches are believed to be suited for more efficient extensions in size by adding additional crossbar planes to a stack of crossbar planes, than are mesh type architectures. So for the purpose of understanding the present invention, the basic components of a prior art crossbar architecture are shown in FIG. 1.

A generalized crossbar as shown in FIG. 1 includes a plurality of satellites S#1 through S#s, where the satellites correspond to network ports, router elements, line cards or other interface structures between communication networks and the switch fabric. The satellites communicate through a plurality of crossbars X-1 through X-m. The satellites communicate with the crossbars through respective sets of satellite to crossbar S2X links 1-1 to 1-$x$ for satellite S#1, and s-1 though s-y for satellite S#s. The aggregate bandwidth for the satellite S#1 is expressed as the summation of the bandwidth of each of the satellite to crossbar links. The number of links from a satellite to a crossbar is dependent upon a particular implementation of the satellite, and may include one or more links per crossbar plane. The satellites include a plurality of links L to the communication channels external to the switch. In the example shown, the satellite S#1 includes n links within aggregate bandwidth equal to the summation of the bandwidth of each of the n links. The input bandwidth from the communication channel over the links L need not be equal to the bandwidth between the satellite and a crossbar over the links S2X, for buffered satellites.

A central arbitration entity 10 is coupled with the crossbars and communicates with each of the satellites through a control communication channel. The control communication channel 11 may be an inband channel which steals cycles from the crossbar switch, or any other type of communication media. A multiple plane crossbar switch, like that shown in FIG. 1, may support static grouping of the fabric pipes, where a group is formed by logically joining links between satellites and a crossbar. In this case, a transmission across a group must request a plurality of elements through the crossbar in order to make a single connection, with a wider bandwidth because of the multiple paths. Thus, for example, if the switch is configured into groups of two crossbar to satellite links, the switch operates at twice the bandwidth with half the port count. In any event, the generalized crossbar architecture of FIG. 1 supports a wide variety of bandwidth and port count configurations. However, the central arbitration entity limits the scalability of the structure because of the increasing complexity encountered as the number of satellite to crossbar links is increased.

With this background, and an understanding of the need for an improved arbitration algorithms for complex switches, it can be understood that a need exists for improved arbitration structures for complex communication switches.

SUMMARY OF THE INVENTION

The present invention improves the scalability and throughput for high-capacity communication switches by providing a distributed arbitration algorithm which addresses the arbitration inefficiency of prior art systems. The invention is based upon distributed arbitration logic units in each satellite unit in a communication switch. The arbitration logic units execute a protocol for computing a connection map for the switch fabric during each arbitration cycle. The protocol includes a plurality of phases including broadcasting backpressure parameters among the arbitration logic units, generating bids for access to switch fabric resources in each of the arbitration logic units utilizing information shared with other arbitration logic units, broadcasting the results of the bidding process, and configuring the switch fabric using the results.

Thus, one embodiment comprises a system for distributed control of a communication switch, in which switch satellites maintain ingress queues for inbound communications from the external communication channels to the switch fabric and egress queues for outbound communications from the switch fabric to the external communication channels. The combination of an ingress queue on a particular satellite and an egress queue on the same or another satellite establishes a virtual output queue. The system includes a plurality of arbitration logic units coupled with respective switch satellites. The arbitration logic units in the plurality include logic to control an arbitration cycle for a given switch cycle.

The arbitration cycle includes a first stage in which performance parameters, such as backpressure parameters, are gathered from other arbitration logic units in the plurality. The performance parameters indicate a status of one or more egress queues maintained in the switch satellites coupled with respective arbitration logic units. A second stage of the arbitration cycle occurs in which bid data are propagated among the plurality of arbitration logic units. The bid data includes a set of bids for use of egress queues during the switch cycle. The bids in the set include a destination identifier indicating a destination egress queue in one of the plurality of switch satellites and a weighted pressure parameter indicating a result of the combination of the performance parameter of the destination egress queues with a condition such as forward pressure of the source ingress queue. The third stage of the arbitration cycle occurs in which a connection map based upon the bidding is computed. In one embodiment, the connection map is broadcast to all switch satellites involved in the arbitration cycle. In a fourth stage, the switch fabric is configured based upon the connection map.

In another embodiment, the ingress and egress queues are configured as virtual output queues, in which the virtual output queues have priorities. In the case of queues with priorities, the weighted pressure parameter is a function of the priority of the virtual output queues involved. The priority of a virtual output queue may be established with reference to the egress queue priority, the ingress queue priority, or an independently established priority.

In another embodiment, the plurality of arbitration logic units respectively include configuration logic that indicates a bid order. In the second stage of the arbitration cycle, a first arbitration logic unit in the order sends bid data to the next arbitration logic unit in the order. The next arbitration logic unit in the order consolidates and sends the bid data to a next arbitration logic unit, and so on until the last arbitration logic unit in the order receives the consolidated bid data. The bid data in the respective arbitration logic units is based upon the gathered performance data and the condition of virtual output queues associated with the inbound queues maintained in the respective switch satellites and any previous arbitration logic unit or units in the order. In one embodiment executed according to the bid order, the connection map is computed in the last arbitration logic unit in order, and broadcast to the other arbitration logic units in the system.

In one preferred embodiment, the switch fabric comprises a crossbar switch with one or more planes. Further, in one embodiment, communication control logic is coupled with the switch fabric and supports synchronous communication among the plurality of arbitration logic units and the switch fabric for purposes of the arbitration cycles.

In one aspect of the invention, a method is provided for distributed control of a communication switch, in which the communication switch comprises a switch fabric and a plurality of switch satellites. The method comprises steps including:

gathering performance parameters in each switch satellite in the plurality from other switch satellites in the plurality, the performance parameters indicating a status of the one or more egress queues maintained in the respective switch satellites, sharing bid data among switch satellites in the plurality, the bid data including a set of bids for use of egress queues during the switch cycle, the bids in the set including a destination identifier indicating a destination egress queue in one of the plurality of switch satellites, and a pressure parameter indicating a result of a combination of the performance parameter of the destination egress queue with a condition of a source ingress queue, computing a connection map based on the bidding in at least one of the switch satellites in the plurality, and configuring the switch fabric based upon the connection map.

In one embodiment of the method, the step of indicating a bid order is included. In this embodiment, the sharing of bid data includes sending bid data in the order from a first switch satellite to a next switch satellite until the last switch satellite in the order receives the bid data. The bid data at the respective switch satellites is based upon the gathered performance data and a condition of inbound queues associated with particular virtual output queues that are maintained in the respective switch satellites and any previous switch satellite or satellites in the order.

In another embodiment, the method includes:

gathering performance parameters in each switch satellite in the plurality from other switch satellites in the plurality, the performance parameters indicating a backpressure of the one or more egress queues maintained in the respective switch satellites;

sharing a bid data matrix among switch satellites in the plurality, the bid data matrix including a set of bids including one bid for each of the virtual output queues for use of egress queues during the switch cycle, the bids in the set including a pressure parameter indicating a result of a combination of the performance parameter of the destination egress queue with a condition of the ingress queue of the virtual output queue;

computing a connection map based on the bidding in at least one of the switch satellites in the plurality; and transmitting a vector to the crossbar switch for configuring the crossbar switch based upon the connection map.

The bid data matrix in one embodiment comprises a data structure for holding a bid for each of the virtual output queues serviced by the crossbar switch. The process includes indicating a bid order of the switch satellites. The step of sharing the bid data matrix includes computing a bid data matrix in a first switch satellite having entries for virtual output queues which originate in the first switch satellite, sending the bid data matrix to the next switch satellite in the order where the next switch satellite re-computes the bid data matrix with entries for virtual output queues originating in the first switch satellite and in said next switch satellite, and sending the bid data matrix to the next switch satellite and so on, until the last switch satellite in the order receives consolidated bid data and finally computes the bid data matrix with entries for virtual output queues originating in all the switch satellites.

By removing the processing load of the arbitration process from the switch fabric, the present invention allows building of switches with varying capacity using simple building blocks so the higher capacity products resemble in architecture and behavior products of lower capacity. Furthermore, switches according to the invention can be expanded to increase performance over time with improved technology.

Other aspects and advantages of the present invention can be seen on review of the figures, the detailed description and the claims which follow.

DETAILED DESCRIPTION

Figure 1:
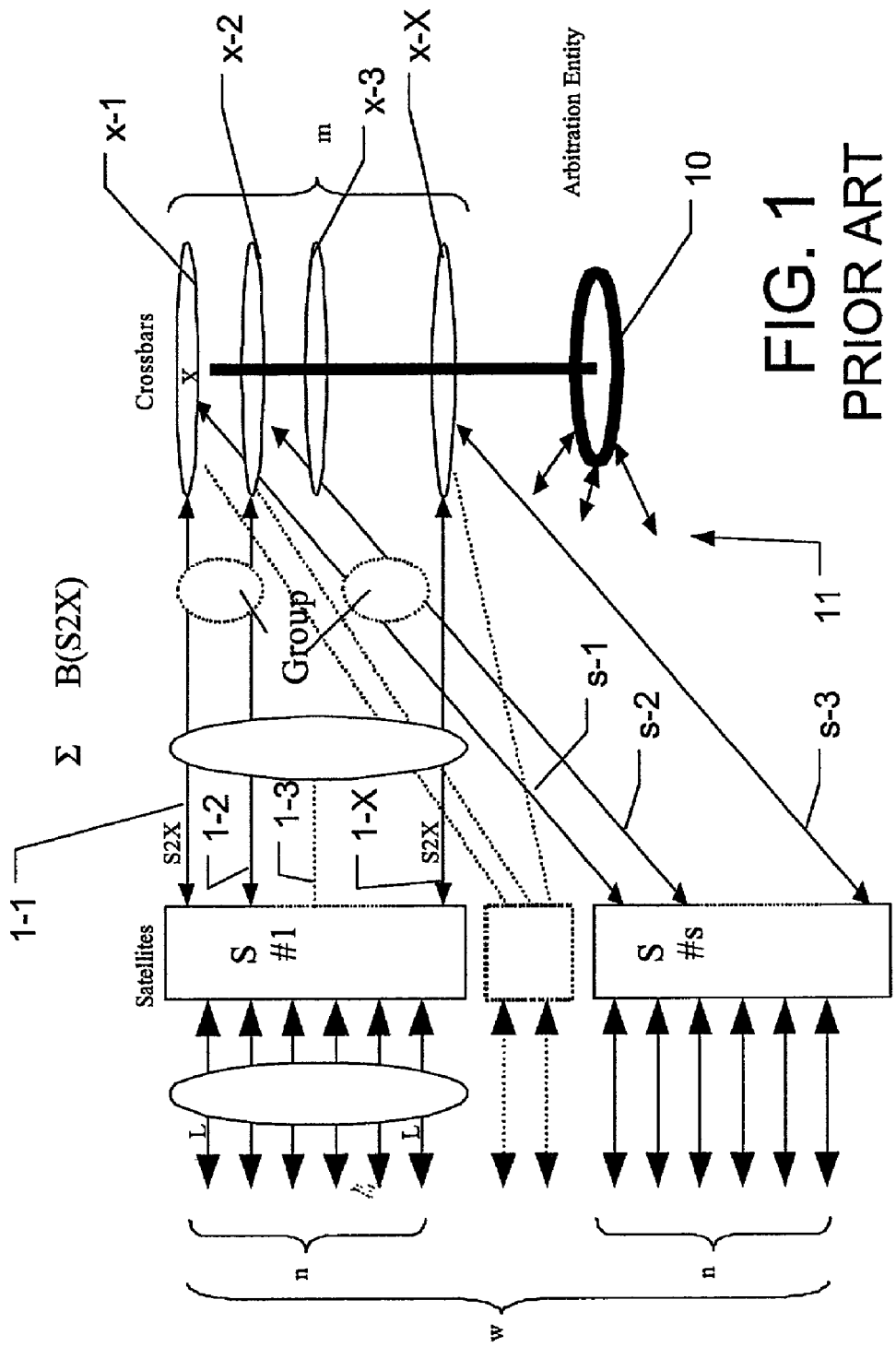
FIG. 1 is a schematic diagram of a generalized crossbar switch architecture according to the prior art.
Figure 2:
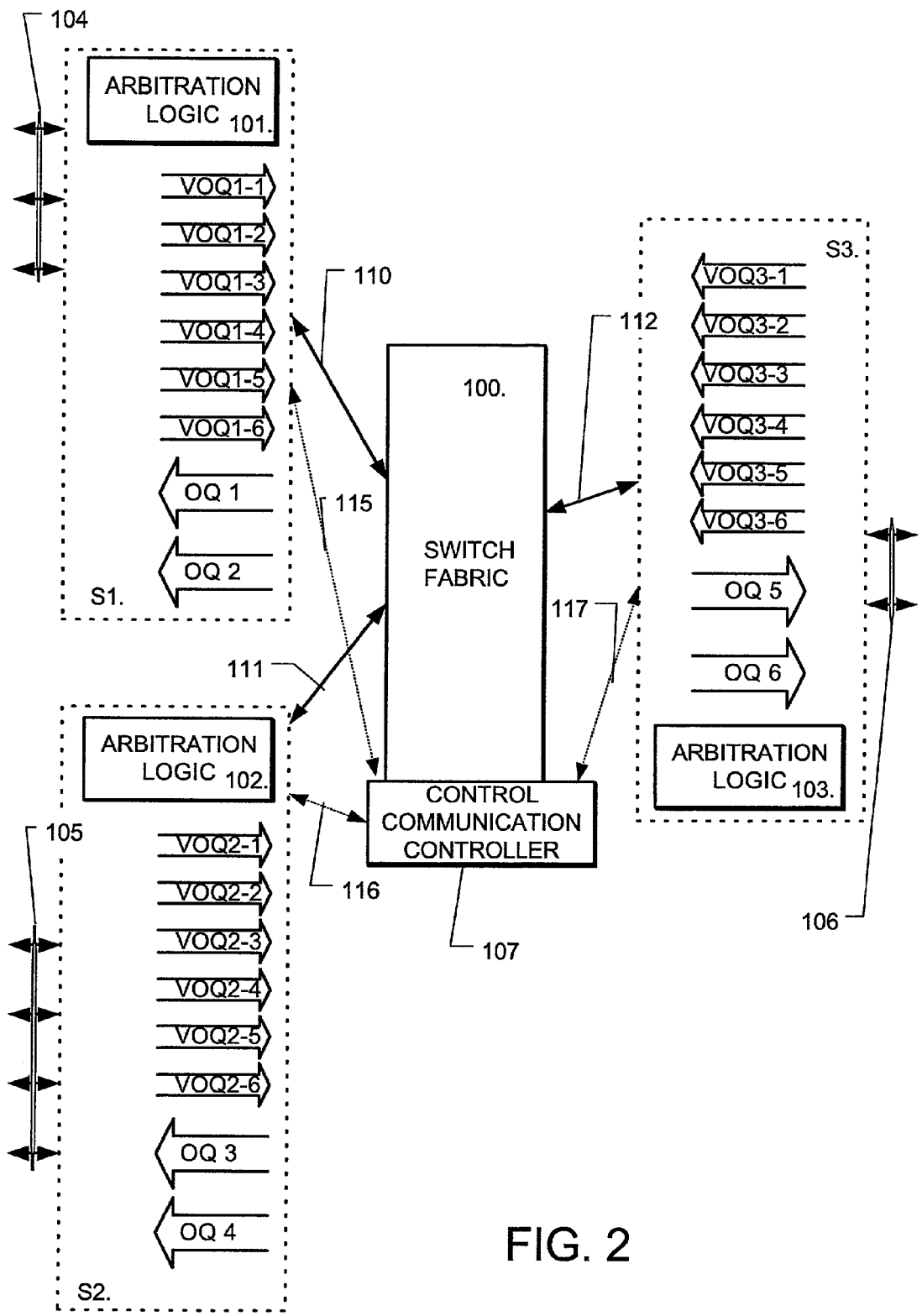
FIG. 2 is a simplified diagram of a communication switch architecture with distributed arbitration logic according to the present invention.
Figure 3:
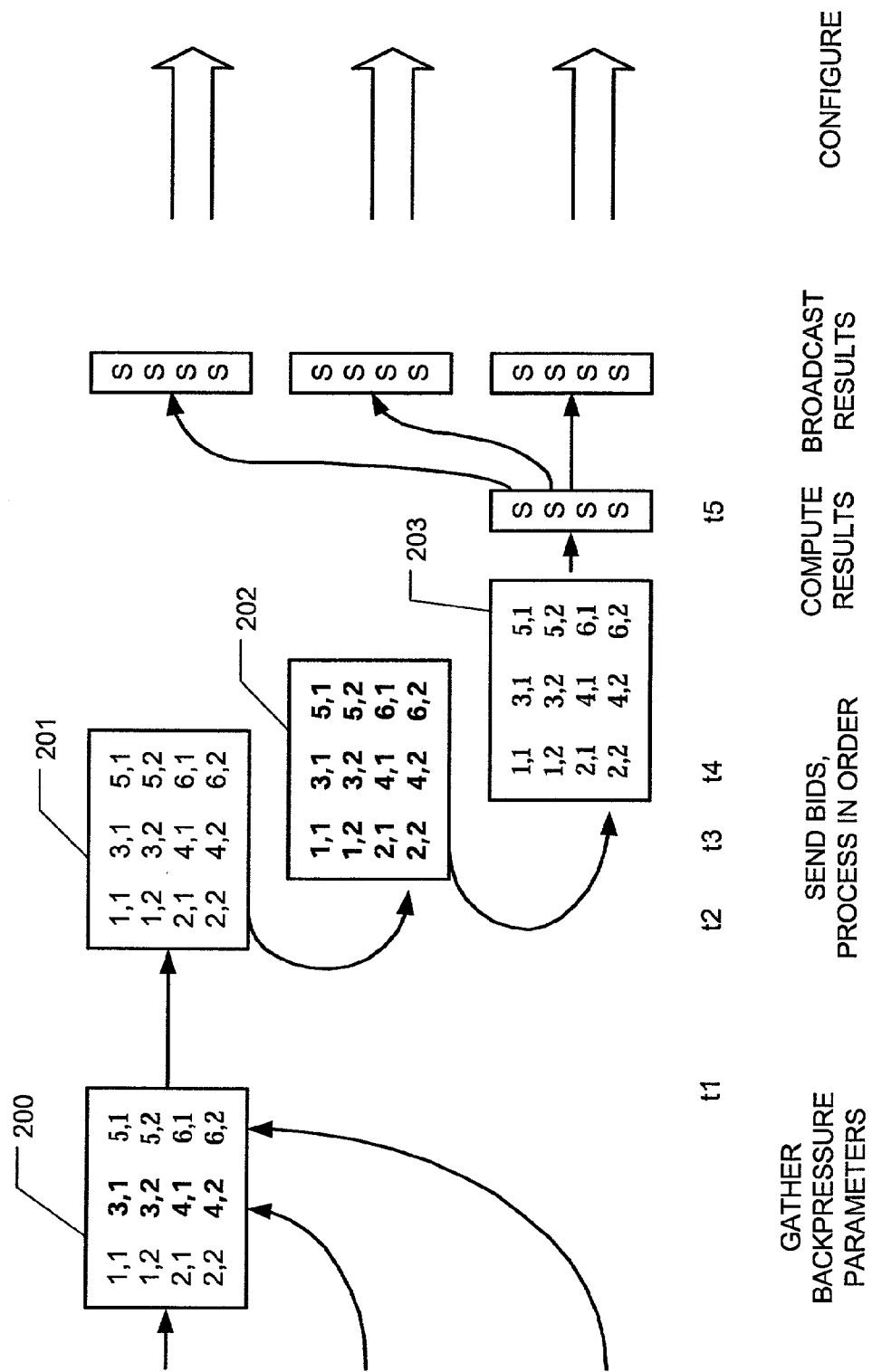
FIG. 3 is a diagram illustrating data flow for a protocol for distributed arbitration in the communication switch of FIG. 2 according to the present invention.

A detailed description of an embodiment of the present invention is provided with respect to FIGS. 2 and 3, in which FIG. 2 shows a communication switch improved with the distributed arbitration logic units of the present invention. FIG. 3 illustrates a representative protocol used for computing a connection map during an arbitration cycle according to the present invention.

The switch architecture of FIG. 2 includes a switch fabric 100 such as a crossbar switch fabric including a plurality of crossbar planes. A plurality of satellites 101, 102, 103 is coupled with the switch fabric 100. The satellites 101, 102, 103 maintain respective ingress Virtual Output Queues VOQs and egress queues. Thus, satellite S1 includes ingress queues VOQ1-1 to VOQ1-6, satellite S2 includes ingress queues VOQ2-1 to VOQ2-6, and satellite S3 includes ingress queues VOQ3-1 to VOQ3-6. Likewise, each of the satellites 101 through 103 includes a plurality of output (egress) queues. Satellite S1 includes output queues OQ1 and OQ2, satellite S2 includes output queues OQ3 and OQ4, and satellite S3 includes output queues OQ5 and OQ6. Each of the satellites includes links to external communication networks. Thus, satellite S1 includes the set of links 104, satellite S2 includes the set of links 105 and satellite S3 includes the set of links 106. According to the present invention, arbitration logic units 101, 102 and 103 are associated with respective satellites S1, S2 and S3. In addition, control communication controller 107 is coupled with the switch fabric 100 to support the arbitration protocol. Each of the switch satellites includes a plurality of satellite to crossbar links 110, 111, 112. Typically, there is at least one link per plane in the crossbar. Where each plane serves a number X of ports for connection to satellite to crossbar links, and each crossbar has the number X of planes, there would typically be the number X links between each satellite S1, S2, S3 and the switch fabric 100. A control channel for use during the arbitration cycle is also included as indicated by lines 115, 116 and 117 between each of the satellites S1, S2, S3, respectively, and the control communication controller 107.

The control communication controller 107 is in charge of forwarding control messages such as backpressure parameters and final arbitration decisions among the arbitration logic units. There is typically at least one control communication controller located on each crossbar plane. Preferably the control communication controller is a low latency device such that processing by it has no significant effect on the speed of operation. The control links 115, 116, 117 connecting each satellite to the control communication controller are connected to arbitration logic units 101, 102, 103 in each of the satellites S1, S2, S3. The control links 115, 116, 117 provide channels by which the arbitration logic units S1, S2, S3 communicate in order to share, update and compute in a distributed manner, the arbitration results for the next transfer cycle through the switch fabric.

The arbitration process is synchronous, and a start cycle signal is applied at the beginning of every arbitration cycle to all system components in a preferred embodiment. Upon initialization, the components are configured with all the parameters required to operate, including a relative position of each satellite, a number of virtual output queues and so on. Because of the synchronous nature of the preferred embodiment, the control communication controllers and the satellites can use the start signal and parameters in order to deduce the precise sequencing of each phase and sub-phase of the arbitration protocol.

The arbitration protocol can be understood with reference to both FIGS. 2 and 3. In a preferred embodiment, the arbitration cycles can be considered in four phases:

1. Broadcast the backpressure;
2. Bid;
3. Broadcast results;
4. Configure.

Each of the four phases is considered in sequence. During the first phase, each satellite having an output queue sends backpressure status for its queues to all other satellites in the system via the control links and the control communication controllers. In FIG. 3, this phase is referred to as the gather backpressure parameters phase, in which the matrix 200 is shown. The numbers in the first column correspond to the satellite S1 with arbitration logic unit 101, the numbers in the second column correspond to satellite S2 with arbitration logic unit 102, and the numbers in the third column correspond to satellite S3 with arbitration logic unit 103. Thus, the first column indicates that the output queue 1 with priority 1 (1,1), output queue 1 with priority 2 (1,2) and so on. In FIG. 3, the numbers computed by each satellite arbitration logic unit is printed in a different font.

The backpressure parameters from the first satellite S1 comprise the first column in this manner because of the presence of the output queues 1 and 2 in the first satellite S1. Likewise, the second column represents the backpressure parameters for output queues 3 and 4 with priorities 1 and 2. The third column represents the backpressure parameters for the third satellite with output queues 5 and 6 having priorities 1 and 2. As can be appreciated, as the number of output queues and priorities increase, the size of the matrix increases dramatically.

In this manner, each arbitration logic unit in the system gathers the matrix 200. The control communication controllers receive the data and broadcast the matrix to all satellites, preferably simultaneously or essentially so, forwarding columns as they come. At a first time, all satellites should have the backpressure matrix 200 for all egress queues. The data items are transmitted in order so their identification is implicit in a preferred embodiment. The size of each data item is based on the number of possible values the backpressure can take. For example, a four-valued backpressure indicating levels such as empty, fairly empty, fairly full and full, requires two bits.

While receiving the backpressure matrix 200 from its neighbors, and using the forward pressure for virtual output queues for each destination and priority, each satellite computes a weighted pressure. Computation of the weighted pressure is accomplished by first computing the differential pressure (dp) for each destination, which is a function of the forward pressure of the ingress queue VOQ on the particular satellite to which the switched traffic is directed, and a backward pressure for the output (egress) queue of the destination satellite to which the channel is directed. Then, according to the priority of the output queue, the differential pressure is converted to the weighted pressure. The exact function used for computation of the differential pressure and of the weighted pressure based upon the forward pressure, the backward pressure and priority is implementation dependent. Other status and performance conditions of the queues and the satellites can be utilized in the computation of the weighted pressure.

Using a bid process, the distributed arbitration scheme collects forwarding threads of the source to the destination queues according to the various priorities. The result of this process is a legal connection map. The process causes the highest pressured queues to bubble up as requests are passed through the bidding satellites.

The process will also try to maximize the number of switched units per arbitration cycle. Note that in the particular case of cell switching, where the switched unit is a self-contained datagram, there is no reason to limit a given destination to one source per priority queue. Packets are usually switched in several switching cycles, so transferring more than one switched unit to the same queue/priority using many links may mix the parts of independent packets irrecoverably.

The first satellite S1 with ingress queues computes its needs for all queues of the first destination satellite, and places the result in the first column of matrix 201. While repeating the same for the next destination, (second column of matrix 201), at time t2 in FIG. 3, satellite S1 sends the four components of the first column (two output queues times two priorities) through the control links, to the second satellite S2.

Each component of the vector has the form (source S, wp), source S is one of satellites S1, S2 or S3, and wp is the weighted pressure. Note that the matrices 201, 202, 203 of FIG. 3 list the item worked upon, not the transmitted result. All elements departing the first satellite S1 would have the form (1, wp): 1 being the name for satellite S1, and wp the weighted pressure for a given queue. The data items are transmitted in order and are implicitly identifiable by the link and the time. The coding of the source can advantageously use incremental length coding; this will be explained later.

At time t4, the first satellite S1 would have finished sending its matrix 201 to satellite S2. Starting at time t2, when it has received the data for the first column of matrix 201, the second satellite S2 will compute its needs, make its bid in the form of matrix 202, and send the results to the third satellite S3, where beginning at time t3 or thereafter, matrix 203 is computed.

The bid work of the first satellite S1 is quite simple. For the next and following satellites, there is more to do:
1) Compare own wp for a given queue to that received from the previous satellite;
2) Update the matrix with the results; and
3) Send the matrix to the next satellite.

None of the participants is allowed to overload any destination, that is in the preferred system, none is allowed to request the transfer to a destination, of more switched units than is physically achievable in one cycle. If more queues have a positive wp than the available load, the highest should be elected. The cases of equal wp should be resolved using Round Robin or randomization scheme.

Bid fairness can be assured following an algorithm such as the following. Let R be a matrix within the S element, of p lines by w columns whose elements are random numbers ranging from 1 to the number of the S element; e.g., R1 of S1 is not used. R2 of S2 has random numbers ranging from 1 to 2 and R3 of S3 has random numbers ranging from 1 to 3. All R's components are updated every arbitration cycle (not every bid transfer).

Let,
dp−(q, p), be the received dp for queue q, priority p
dp0(q, p), be the self dp for queue q, priority p
dp+(q, p), be the transmitted dp for queue q, priority p
source, be the transmitted bid winner for this queue/priority If dp−(q, p)≠dp0(q, p), then the highest value is sent as dp+(q, p) and the source is its owner.

If dp−(q, p)=dp0(q, p), then its owner is elected as source for only one value of the corresponding random number R(q, p), e.g., for the value 1. This strategy insures fairness of the bubbled-up winner even in the case of all equal bids.

Example on S3
Possible values for R3 are 1 or 2 or 3
If R3(q, p)=1, then dp+(q, p)=dp0(q, p): the random being 1, S3 wins
If R3(q, p)=2, then dp+(q, p)=dp−(q, p): the random being 2, S3 loses
If R3(q, p)=3, then dp+(q, p)=dp−(q, p): the random being 3, S3 loses Sharing the destination bandwidth is accomplished as follows in one example. If a destination is fully loaded, then, in order to satisfy a satellite's own higher wp bid, it should purge a lower wp in order to make room. In case of equal-valued lower wp, deletion should use randomization or Round Robin. This is the reason why, in order to make to bid for a queue in a destination, the satellite element needs to know the status of all requests for that destination. In the following example, in the notation in each entry in the matrix is a three integer value: q.p:u, indicating that the wp=u for absolute queue q (numbered 1..6), priority p.

Assume satellite S1 has following needs, indicated by the entries in the matrix with non-zero weighted pressure.

| 1.1:0 | 3.1:0 | 5.1:0 |
|---|---|---|
| 1.2:0 | 3.2:0 | 5.2:0 |
| 2.1:0 | 4.1:0 | 6.1:3 |
| 2.2:0 | 4.2:0 | 6.2:2 | and satellite S2 has following needs

| 1.1:0 | 3.1:0 | 5.1:4 |
|---|---|---|
| 1.2:0 | 3.2:0 | 5.2:0 |
| 2.1:0 | 4.1:0 | 6.1:0 |
| 2.2:0 | 4.2:0 | 6.2:0 |

Further assume that there are just two logical links through the switch fabric, so all three bids cannot be satisfied. Then, satellite S2 should delete satellite S1's bid for queue.priority 6.2 and elect satellite S2's bid for queue.priority 5.1.

Source overload is supported by the arbitration logic in one preferred embodiment, and is handled in one example as follows. A satellite S element can make requests in excess of its own load (dequeue capacity). In the case of FIG. 2 with four crossbar planes, for example, a source can request to dequeue more then 4 queues (while respecting the rule of avoiding destination overload). The condition is that the excess (e.g. above 4), in the order of the destination scan—hence chronological order—has a lower wp than the first four. Successor satellite S element is allowed to win artificially over these excess requests until its own load capacity is satisfied. Thereafter, bidding can continue as in the normal case on the source overloaded capacity. The last satellite S is not allowed to make source overload and must delete all excess requests from all sources, which it does not need to use.

In the following examples, the notation q.p:u means wp=u for absolute queue q (numbered 1.6), priority p:

Case 1) Assume satellite S1 has following needs:

| 1.1:0 | 3.1:3 | 5.1:0 |
|---|---|---|
| 1.2:0 | 3.2:4 | 5.2:0 |

-continued

| | | |
|---|---|---|
| 2.1:0 | 4.1:3 | 6.1:2 |
| 2.2:0 | 4.2:2 | 6.2:0 |

Satellite S1 could make all these requests.

Case 2) If the need for 6.1 were 6.1:4, it would need to limit it requests to

| | | |
|---|---|---|
| 1.1:0 | 3.1:3 | 5.1:0 |
| 1.2:0 | 3.2:4 | 5.2:0 |
| 2.1:0 | 4.1:3 | 6.1:4 |
| 2.2:0 | 4.2:0 | 6.2:0 |

Case 1.1) Assume satellite S1 has needs of case 1

| | | |
|---|---|---|
| 1.1:0 | 3.1:3 | 5.1:0 |
| 1.2:0 | 3.2:4 | 5.2:0 |
| 2.1:0 | 4.1:3 | 6.1:2 |
| 2.2:0 | 4.2:2 | 6.2:0 | and satellite S2 has following needs

| | | |
|---|---|---|
| 1.1:1 | 3.1:0 | 5.1:0 |
| 1.2:1 | 3.2:0 | 5.2:1 |
| 2.1:0 | 4.1:0 | 6.1:1 |
| 2.2:0 | 4.2:0 | 6.2:0 |

Then satellite S2 would artificially win for 6.1 though its wp is 1 whereas S1's is 2.

Un-biasing the destinations can be addressed by the following process. The process of avoiding source overload may result in biasing of destinations due to the sequential scan. Biasing can be avoided by randomizing the order of the list (columns of matrices 201, 202, 203 in FIG. 3). Synchronization can be assured by starting with the same seed and using the same pseudo-random generator on every arbitration entity of every S.

Avoiding starvation in queues can be addressed as follows. A scheduling based only on the differential pressure dp, may induce indefinite starvation to a low dp queue. This can be avoided by requesting each S to artificially inflate the dp of a low dp queue which has not been served for a while.

Preserving the packet's order can be addressed as follows. Once the first transfer unit of a packet has been transferred to a given destination priority queue, all consecutive units should be transferred uninterrupted by the same source. This can be achieved by changing the dp to the highest reserved value indicating 'locked' for this destination, until the packet end.

Hot insertion of new satellites which results in a form of synchronized random sequence, can be dealt with either by self-synchronizing sequences or by resetting all random generators at the beginning of the cycle in which the new satellite S participates. Likewise, there should be means to update the relative position of the satellite S elements.

The case of overflow in any queue is handled, preferably, by dropping packets at source as opposed to destination in order to spare the fabric bandwidth. In case of overflow at the input of one transfer unit, it may be interesting to flush the remainder of the packet.

Incremental length source coding may be used. The length of the source field transmitted in the bid phase does not need to be constant. One can see that satellite S1 does not need to send a field identifying itself at all as whatever reaches satellite S2 comes necessarily from satellite S1 in the order. Likewise, source transmitted from satellite S2 to satellite S3 is either 1 or 2 and can be coded with one bit. Generally, the source field length can be coded with the number of bits required to code the (S number—1) or indeed the S number if these were counted from 0.

The bid process is repeated by all three satellites. At t3, the third satellite S3 broadcasts its bid result, which should be legal, i.e. free of source or destination overload, via the control communication controllers. This should be used as a connection map to itself and all neighboring satellites. Once the map transmitted to all satellites, each destination can proceed to the configuration of the crossbars.

In the final phase of the arbitration cycle, the crossbars are configured. Each destination satellite, using its control links, sends at t5 simultaneously to the attached crossbars one scalar, identifying the source it wants to dequeue using the corresponding data communication link. Both the source and the destination would know, at this point, which source/priority to dequeue and which destination/priority to enqueue, using that link.

The process described above should be regarded as one example of implementation. Alternative processes can trade complexity against performance. For example, a high bandwidth control communication controller and associated links together with higher processing power of the arbitration entities within the satellite S elements can be used. In such an implementation, many columns—ultimately all columns—of the matrices can be transmitted at once for a very fast arbitration cycle.

Other algorithms can be deployed so as to speed up the bid process, e.g., to be proportional to the logarithm of number of satellites instead of the number of satellites. Indeed, many distributed sorting algorithms can be applied to the bid process.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for distributed control of a communication switch, including a switch fabric and plurality of switch satellites, in which the switch satellites include interfaces to external communication channels and interfaces to the switch fabric, and maintain one or more ingress queues for ingress communications from the external communication channels to the switch fabric, and one or more egress queues for egress communications from the switch fabric to the external communication channels, comprising:

a plurality of arbitration logic units coupled with respective switch satellites, a particular arbitration logic unit in the plurality of arbitration logic units including logic to control an arbitration cycle for a given switch cycle, including a first stage in which performance parameters are gathered from other arbitration logic units in the plurality, the performance parameters indicating a status of the one or more egress queues maintained in the switch satellites coupled with the respective arbitration logic units, a second stage in which bid data are propagated among the plurality, the bid data including a set of bids for use of egress queues during the switch cycle, the bids in the set including a destination identifier indicating a destination egress queue in one of the plurality of switch satellites, and a pressure parameter indicating a result of a combination of the performance parameter of the destination egress queue with a condition of a source ingress queue, a third stage in which a connection map based on the bid data gathered from the plurality of arbitration units is computed, and a fourth stage in which the switch fabric is configured, based upon the connection map.

2. The system or claim 1, wherein said bids include priority parameters, and wherein said pressure parameter is a function of said priority parameters.

3. The system of claim 1, wherein the plurality of arbitration logic units include configuration logic indicating a bid order, and the second stage includes a first arbitration logic unit in the order sending bid data to a next arbitration logic unit in the order, the next arbitration unit in the order consolidating and sending bid data to a next, and so on until the last arbitration logic unit in the order receives consolidated bid data, the bid data in the respective arbitration logic units being based upon the gathered performance data and conditions of ingress queues maintained in the respective arbitration logic unit and any previous arbitration logic unit, or units, in the order.

4. The system or claim 3, wherein the third stage includes completing the formation of the connection map at the last arbitration logic unit in the order.

5. The system of claim 4, wherein the third stage includes broadcasting the connection map from the last arbitration logic unit in the order to the other arbitration logic units in the plurality.

6. The system of claim 1, wherein the switch fabric comprises a crossbar switch.

7. The system of claim 1, including control communication logic coupled with the switch fabric supporting communication among the plurality of arbitration logic units.

8. The system of claim 1, including control communication logic coupled with the switch fabric synchronizing communication among the plurality of arbitration logic units during an arbitration cycle.

9. The system of claim 1, including control communication logic coupled with the switch fabric supporting communication of the connection map to the switch fabric from at least one of the plurality of arbitration logic units.

10. The system of claim 1, wherein the performance parameter comprises a measure of backpressure.

11. The system of claim 1, wherein said plurality of arbitration logic units support a source overload condition, and source biasing is reduce by randomizing the order of bids.

12. A method for distributed control of a communication switch, including a switch fabric and a plurality of switch satellites, in which the switch satellites include interfaces to external communication channels and interfaces to the switch fabric, and maintain one or more ingress queues for ingress communications from the external communication channels to the switch fabric, and one or more egress queues for egress communications from the switch fabric to the external communication channels, comprising:

gathering performance parameters in each switch satellite in the plurality from other switch satellites in the plurality, the performance parameters indicating a status of the one or more egress queues maintained in the respective switch satellites, sharing bid data among switch satellites in the plurality, the bid data including a set of bids for use of egress queues during the switch cycle, the bids in the set including a destination identifier indicating a destination egress queue in one of the plurality of switch satellites, and a pressure parameter indicating a result of a combination of the performance parameter of the destination egress queue with a condition of a source ingress queue, computing a connection map based on the bid data gathered from the plurality of arbitration units in at least one of the switch satellites in the plurality, and configuring the switch fabric based upon the connection map.

13. The method of claim 12, wherein said bids include priority parameters, and wherein said pressure parameter is a function of said priority parameters.

14. The method of claim 12, including indicating a bid order of the switch satellites, and sharing the bid data includes sending bid data to a next switch satellite in the order, the next switch satellite in the order consolidating and sending bid data to a next, and so on until the last switch satellite in the order receives consolidated bid data, the bid data in the respective switch satellites being based upon the gathered performance data and conditions of ingress queues maintained in the respective switch satellite and any previous switch satellite, or satellites, in the order.

15. The method of claim 14, including completing the formation of the connection map at the last switch satellite in the order.

16. The method of claim 15, including broadcasting the connection map from the last switch satellite in the order to the other switch satellites in the plurality.

17. The method of claim 12, wherein the switch fabric comprises a crossbar switch.

18. The method of claim 12, including supporting communication among the plurality of switch satellites through the switch fabric.

19. The method of claim 12, including synchronizing communication among the plurality of switch satellites during an arbitration cycle.

20. The method of claim 12, including supporting communication of the connection map to the switch fabric from at least one of the plurality of switch satellites.

21. The method of claim 12, wherein the performance parameter comprises a measure of backpressure.

22. The method of claim 12, including supporting a source overload condition, and reducing source bias by randomizing the order of the sets of bids.

23. A method for distributed control of a communication switch, including a crossbar switch and a plurality of switch satellites, in which the switch satellites include interfaces to external communication channels and interfaces to the switch fabric, and maintain one or more ingress queues for ingress communications from the external communication channels to the crossbar switch, and one or more egress queues for egress communications from the crossbar switch to the external communication channels, where an ingress queue constitutes virtual output queue for one of the one or more egress queues, the method comprising:

gathering performance parameters in each switch satellite in the plurality from other switch satellites in the plurality, the performance parameters indicating a backpressure of the one or more egress queues maintained in the respective switch satellites;

sharing a bid data matrix among switch satellites in the plurality, the bid data matrix including a set of bids including one bid for each of the virtual output queues for use or egress queues during the switch cycle, the bids in the set including a weighted pressure parameter indicating a result of a combination of the performance parameter of the destination egress queue with a condition of the ingress queue of the virtual output queue;

computing a connection map based on the bid data matrix in at least one of the switch satellites in the plurality; and transmitting a vector to the crossbar switch for configuring the crossbar switch based upon the connection map.

24. The method of claim 23, wherein the bid data matrix comprises a data structure for holding a bid for each of the virtual output queues serviced by the crossbar switch, and including indicating a bid order of the switch satellites, and sharing the bid data matrix includes computing bid data matrix in a first switch satellite having entries for virtual output queues which originate in the first switch satellite, sending the bid data matrix to a next switch satellite in the order, the next switch satellite in the order re-computing the bid data matrix with entries for virtual output queues originating in the said first switch satellite and said next switch satellite, and sending bid data to a next, and so on until the last switch satellite in the order receives consolidated bid data and finally computes the bid data matrix with entries for virtual output queues originating in all the switch satellites.

25. The method of claim 23, including supporting communication among the plurality of switch satellites through the switch fabric.

26. The method of claim 23, including synchronizing communication among the plurality of switch satellites during an arbitration cycle.

27. The method of claim 23, including supporting a source overload condition, and reducing source bias by randomizing the order of the sets of bids.

* * * * *